(12) United States Patent
Kurosawa

(10) Patent No.: US 7,541,718 B2
(45) Date of Patent: Jun. 2, 2009

(54) ULTRASONIC MOTOR

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 21 days.

(21) Appl. No.: 11/958,591

(22) Filed: Dec. 18, 2007

(65) Prior Publication Data
US 2008/0150394 A1   Jun. 26, 2008

(30) Foreign Application Priority Data
Dec. 20, 2006   (JP) ............... 2006-342092

(51) Int. Cl.
*H01L 41/08* (2006.01)
(52) U.S. Cl. .............. 310/323.09; 310/323.11
(58) Field of Classification Search ...............
310/323.01–323.04, 323.08–323.09, 323.11, 310/323.14, 333
See application file for complete search history.

(56) References Cited

U.S. PATENT DOCUMENTS

| | | | | |
|---|---|---|---|---|
| 4,959,579 A | * | 9/1990 | Kuwabara et al. | 310/323.09 |
| 5,363,006 A | * | 11/1994 | Yano et al. | 310/323.11 |
| 2007/0057596 A1 | | 3/2007 | Kurosawa | |
| 2007/0085448 A1 | | 4/2007 | Kurosawa | |
| 2007/0145859 A1 | | 6/2007 | Kurosawa | |

FOREIGN PATENT DOCUMENTS

JP   9-98587   4/1997

OTHER PUBLICATIONS

English language Abstract of JP 9-98587.
U.S. Appl. No. 11/955,639 to Kurosawa, which was filed on Dec. 13, 2007.
U.S. Appl. No. 11/865,848 to Kurosawa, which was filed on Oct. 2, 2007.

* cited by examiner

*Primary Examiner*—Quyen P Leung
*Assistant Examiner*—Karen B Addison
(74) *Attorney, Agent, or Firm*—Greenblum & Bernstein, P.L.C.

(57) ABSTRACT

An ultrasonic motor includes a stator that includes a comb body with a plurality of circumferentially-arranged comb-like projections and a piezoelectric body integrally mounted on the comb body, a rotor rotatable with respect to the stator, the rotor establishing pressure contact with the stator, a resin film formed on at least one of pressure contact surfaces of the stator and rotor, and a pressure contact force controlling portion that includes, an elastic member configured to generate a pressure contact force between the stator and rotor with an elastic force thereof, and a compressing portion configured to compress and shorten the elastic member. The pressure contact force controlling portion controls the pressure contact force between the stator and rotor by varying the elastic force of the elastic member depending on temperature of the motor.

8 Claims, 6 Drawing Sheets

ULTRASONIC MOTOR

BACKGROUND OF THE INVENTION

The disclosure relates to an ultrasonic motor, particularly, to an ultrasonic motor configured to prevent variation of rotational efficiency thereof along with a temperature change.

An ultrasonic motor is configured with a stator, which includes a piezoelectric body with a plurality of polarized piezoelectric segments circumferentially arranged, and a rotatable disc-shaped or annular rotor in contact with the stator under a predetermined pressure. In the ultrasonic motor, the piezoelectric body of the stator is vibrated with radio frequency voltage being applied thereto. The induced vibration of the piezoelectric body is enhanced in a circumferential direction of the stator by a comb body provided integrally to the piezoelectric body such that the comb body is driven to induce a traveling vibration wave in the circumferential direction. Thereby, the rotor, which frictionally engages with the piezoelectric body, can be rotated around an axis thereof. The comb body has a function of enlarging amplitude of the vibration of the piezoelectric body. However, since the amplitude is generally one micrometer to three micrometers, it is required that the comb body establishes close contact with the rotor evenly in the circumferential and radial directions of the stator, and that both close-contact surfaces between the comb body and the rotor are configured as pressure contact surfaces with a desired pressure contact force being applied thereto, so as to improve rotational efficiency of the rotor (i.e., rotational energy of the rotor to vibration energy of the stator). Therefore, when the ultrasonic motor has not been driven for a long time, the pressure contact surfaces between the comb body and the rotor come into a state of interfacial adhesion due to the pressure contact force, and it increases a static frictional force therebetween. Thereby, a large torque is needed for rotating the rotor at start-up of the ultrasonic motor, and the ultrasonic motor cannot begin smooth rotation. In the worst case, the motor cannot be rotated.

In order to solve such a problem at the start-up of the motor, there has been proposed a technology in which a resin layer with a low frictional coefficient is formed on any of the pressure contact surfaces between the comb body and the rotor to reduce the static frictional force therebetween. Fluorocarbon resin such as polytetraflouroethylene (PTFE) can be cited as an example of the resin layer. In Japanese Patent Provisional Publication No. HEI 9-98587, there is proposed a technique in which a slider formed from polymer resin is attached onto a surface of the rotor. The technique is regarded as one of possible solutions that can prevent the interfacial adhesion between the pressure contact surfaces of the comb body and the rotor and reduce the static frictional force.

Thus, the resin layer with a low frictional coefficient thereon that is formed on one of the pressure contact surfaces between the comb body and the rotor can reduce the static frictional force generated between both of the pressure contact surfaces. It means that the formation of the resin layer is so effective that the ultrasonic motor can smoothly be started up to a steady-state rotation state. However, this kind of resin has such a property that the frictional coefficient thereon varies depending on temperature. In particular, some kinds of resins have such a property that the frictional coefficient thereon is made lower than that at room temperature when the temperature rises. The aforementioned PTFE is provided with the property. In the ultrasonic motor with the resin layer being formed, when the temperature of the resin layer increases due to frictional heat generated between the comb body and the rotor along with the rotation of the motor, the frictional coefficient is made lower than necessary. Thereby, both the pressure contact surfaces between the comb body and the rotor come into a slippery state. Hence, the traveling vibration wave of the comb body cannot efficiently be transmitted to the rotor. Consequently, the rotational efficiency of the rotor, that is, the rotational efficiency of the ultrasonic motor gets worse, and thereby the rotational torque of the ultrasonic motor is reduced.

SUMMARY OF THE INVENTION

The present invention is advantageous in that there can be provided an improved ultrasonic motor that makes it possible to prevent rotational efficiency thereof from being worsened even though temperature of the motor increases along with rotation of the motor.

According to an aspect of the present invention, there is provided an ultrasonic motor, which includes a stator that includes a comb body with a plurality of circumferentially-arranged comb-like projections and a piezoelectric body integrally mounted on the comb body, a rotor rotatable with respect to the stator, the rotor establishing pressure contact with the stator, a resin film formed on at least one of pressure contact surfaces of the stator and rotor, and a pressure contact force controlling portion that includes an elastic member configured to generate a pressure contact force between the stator and rotor with an elastic force thereof, and a compressing portion configured to compress and shorten the elastic member. The pressure contact force controlling portion controls the pressure contact force between the stator and rotor by varying the elastic force of the elastic member depending on temperature of the motor.

Optionally, the elastic member may include a compression coil spring provided between the stator and rotor. In this case, the compression coil spring may be formed from shape-memory material that varies a natural length thereof depending on the temperature. Further, in this case, the compressing portion may compress and shorten the compression coil spring down to a predetermined length.

Alternatively or optionally, the elastic member may include a compression coil spring provided between the stator and rotor. In this case, the compressing portion may vary a compressed length of the compression coil spring depending on the temperature.

Still optionally, the compressing portion may include a bush provided to the stator so as to rotatably support the rotor, and the compression coil spring may be inserted into the bush. In this case, the bush may be formed from shape-memory material such that a length thereof in an axial direction thereof varies depending on the temperature.

Alternatively or optionally, the compressing portion may include a bush provided to the stator, a ball bearing configured to rotatably support the rotor, the ball bearing being biased by the compression coil spring inside the bush, and a locking member configured to lock the ball bearing biased by the compression coil spring so as to rotatably support the rotor. In this case, the locking member may be formed from shape-memory material to change a locking position where the ball bearing is locked depending on the temperature.

Optionally, the resin film may include fluorocarbon resin.

Further optionally, the fluorocarbon resin included in the resin film may include at least one of polytetraflouroethylene (PTFE), perfluoroalkoxy polymer resin (PFA), and fluorinated ethylene-propylene (FEP).

According to another aspect of the present invention, there is provided an ultrasonic motor, which includes a stator that includes a comb body with a plurality of circumferentially-arranged comb-like projections and a piezoelectric body integrally mounted on the comb body, a rotor rotatable with respect to the stator, the rotor establishing pressure contact with the stator, a resin film formed on at least one of pressure contact surfaces of the stator and rotor, a frictional coefficient on the resin film varying depending on temperature of the motor, and a pressure contact force controlling portion that includes, an elastic member configured to generate a pressure contact force between the stator and rotor with an elastic force thereof, and a compressing portion configured to compress and shorten the elastic member. The pressure contact force controlling portion controls the pressure contact force between the stator and rotor by varying the elastic force of the elastic member depending on the temperature such that a frictional force on the resin film is maintained substantially constant.

BRIEF DESCRIPTION OF THE ACCOMPANYING DRAWINGS

Figure 3:
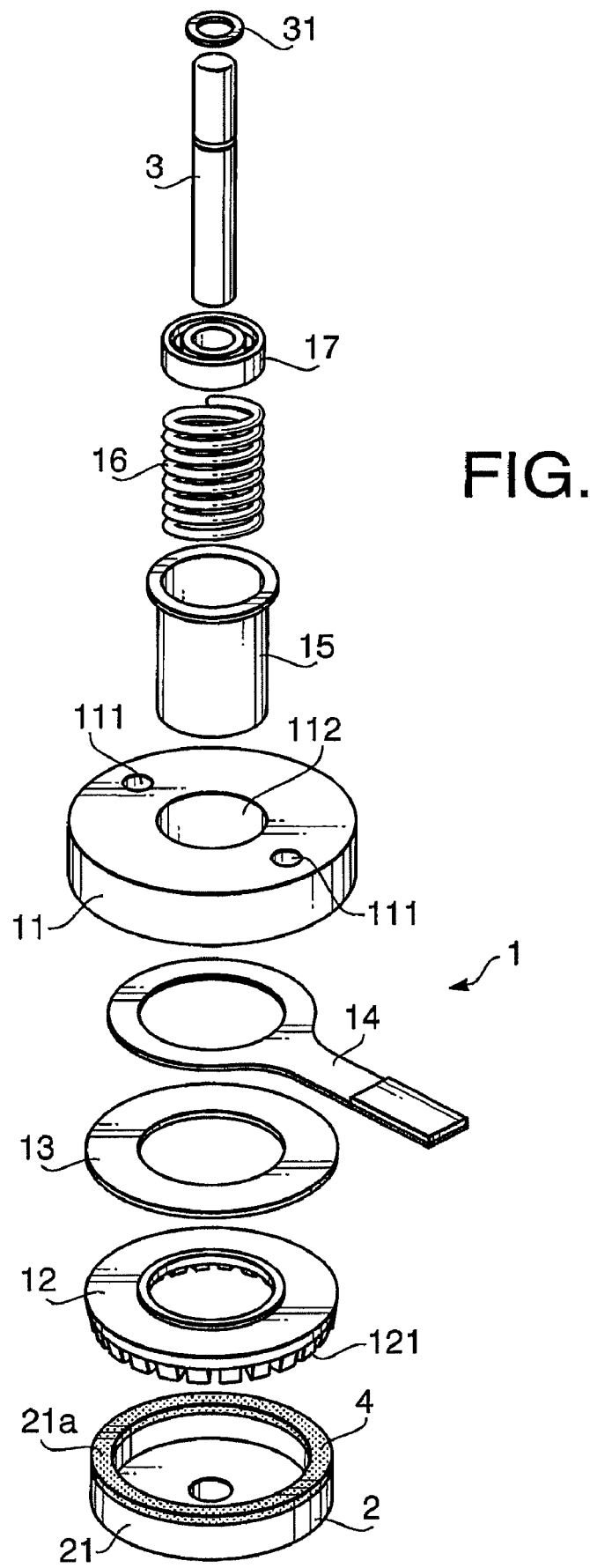

FIG. 3 partially shows an exploded perspective view of the ultrasonic motor in the first embodiment according to the present invention.

Figure 4:
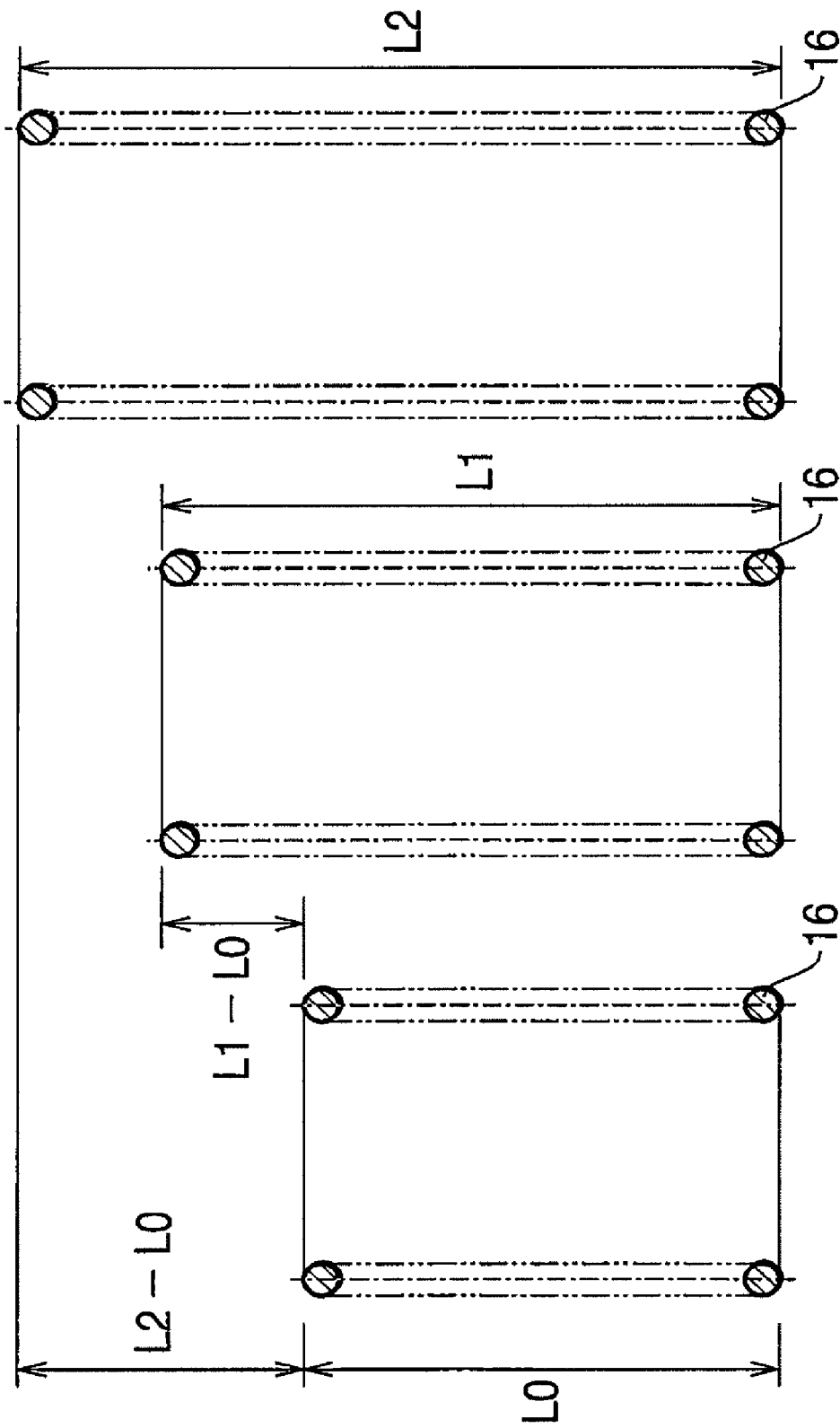

FIGS. 4A, 4B, and 4C are illustrations for explaining lengths of a compression coil spring in the first embodiment according to the present invention.

Figure 5:
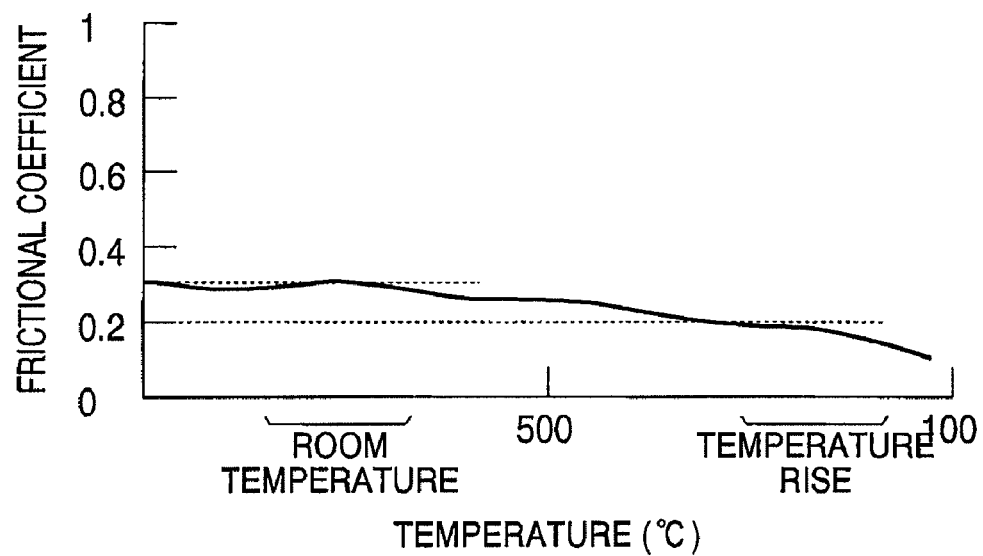

FIG. 5 shows temperature dependency of a frictional coefficient on a resin film in the first embodiment according to the present invention.

Figure 6:
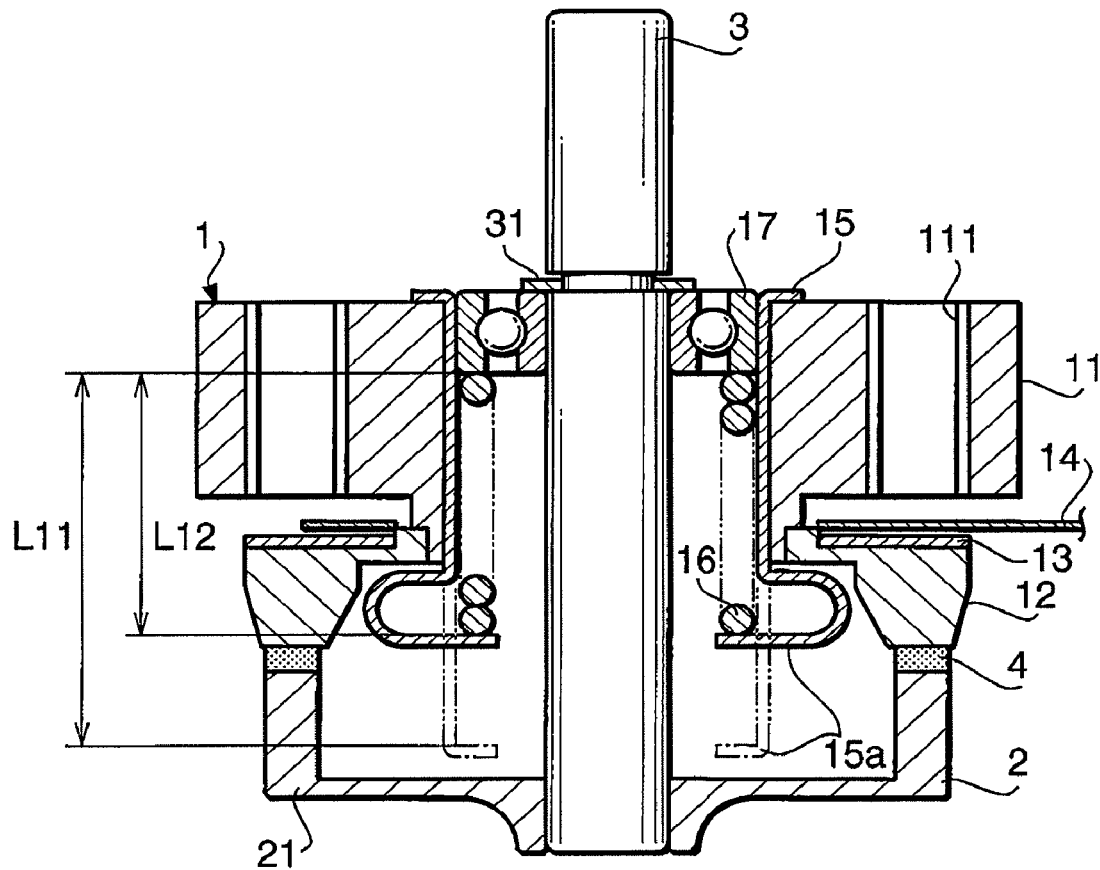

FIG. 6 is a cross-sectional view of an ultrasonic motor along a plane including a center axis of a rotating shaft thereof in a second embodiment according to the present invention.

Figure 7:
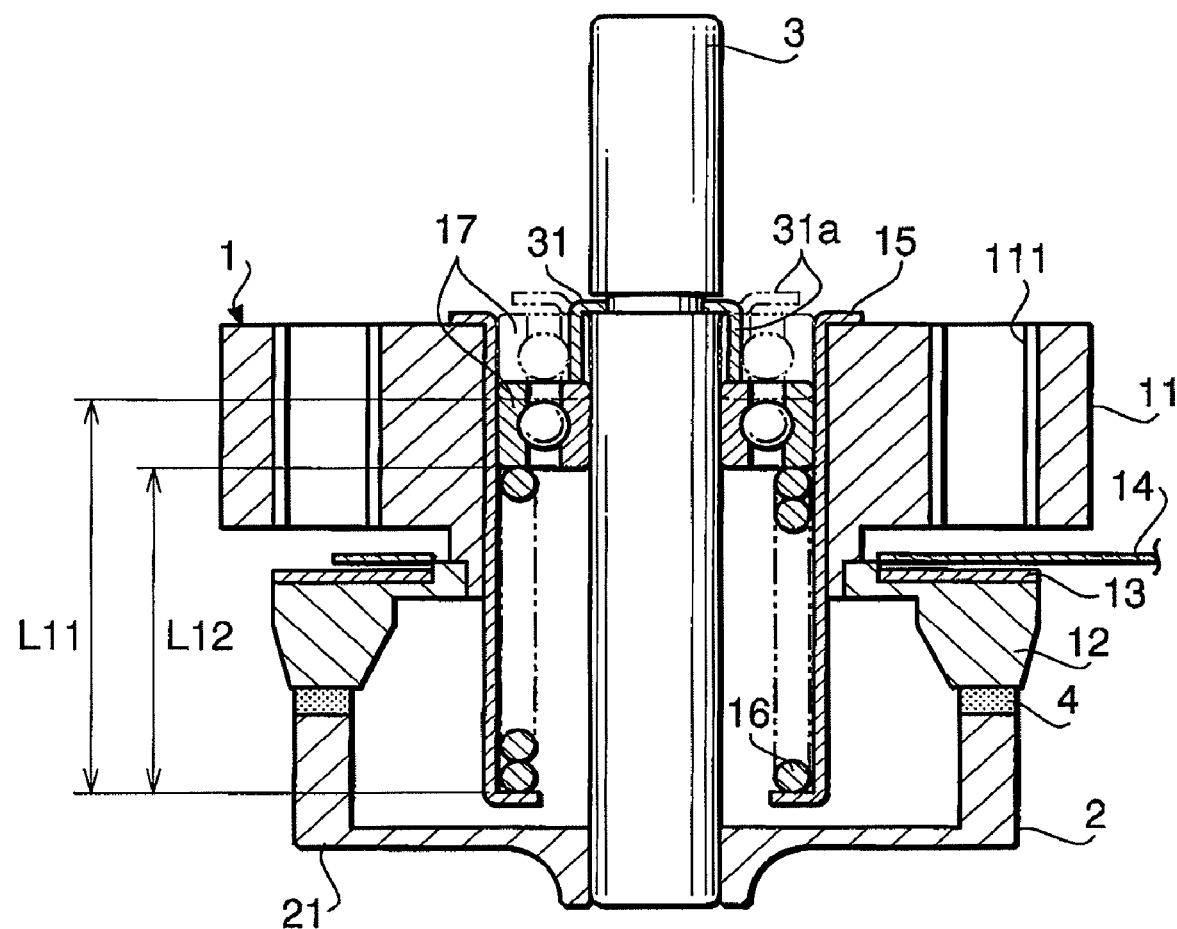

FIG. 7 is a cross-sectional view of an ultrasonic motor along a plane including a center axis of a rotating shaft thereof in a third embodiment according to the present invention.

DETAILED DESCRIPTION OF THE EMBODIMENTS

Figure 1:
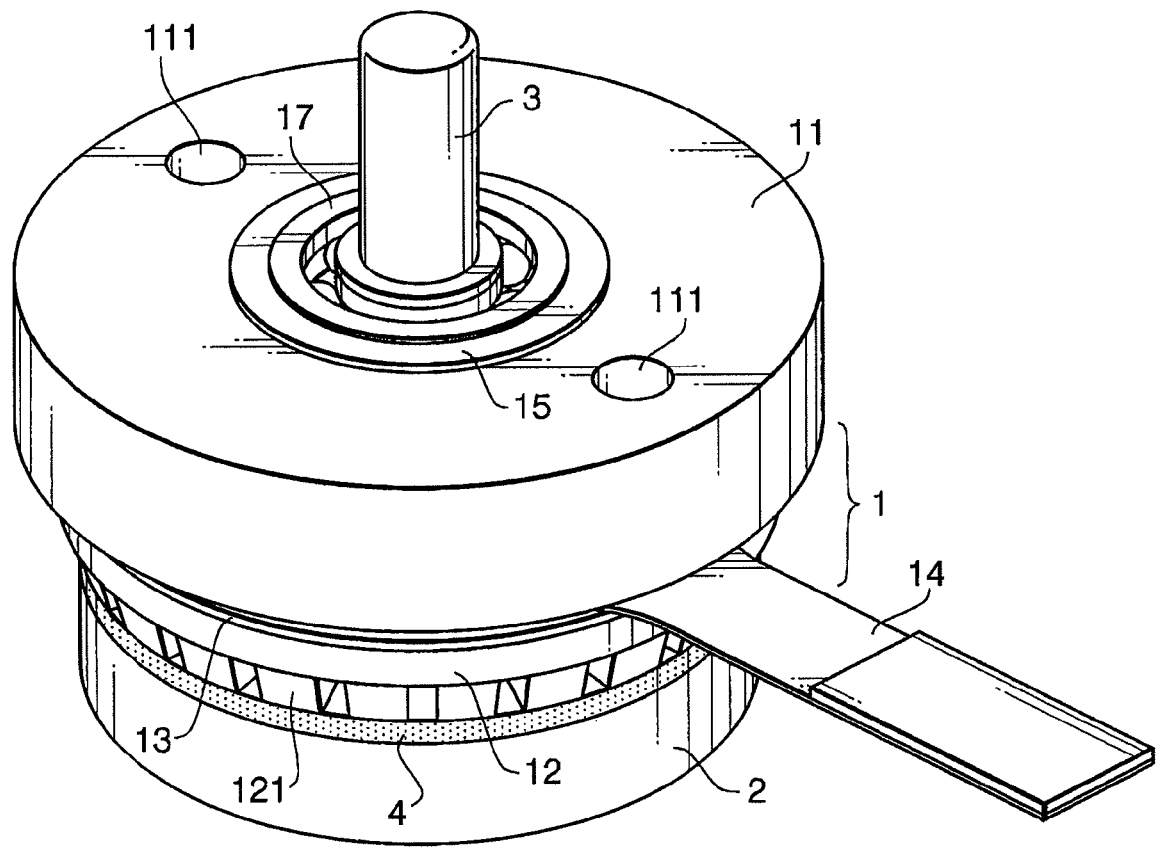
FIG. 1 is an external perspective view of an ultrasonic motor in a first embodiment according to the present invention.
Figure 2:
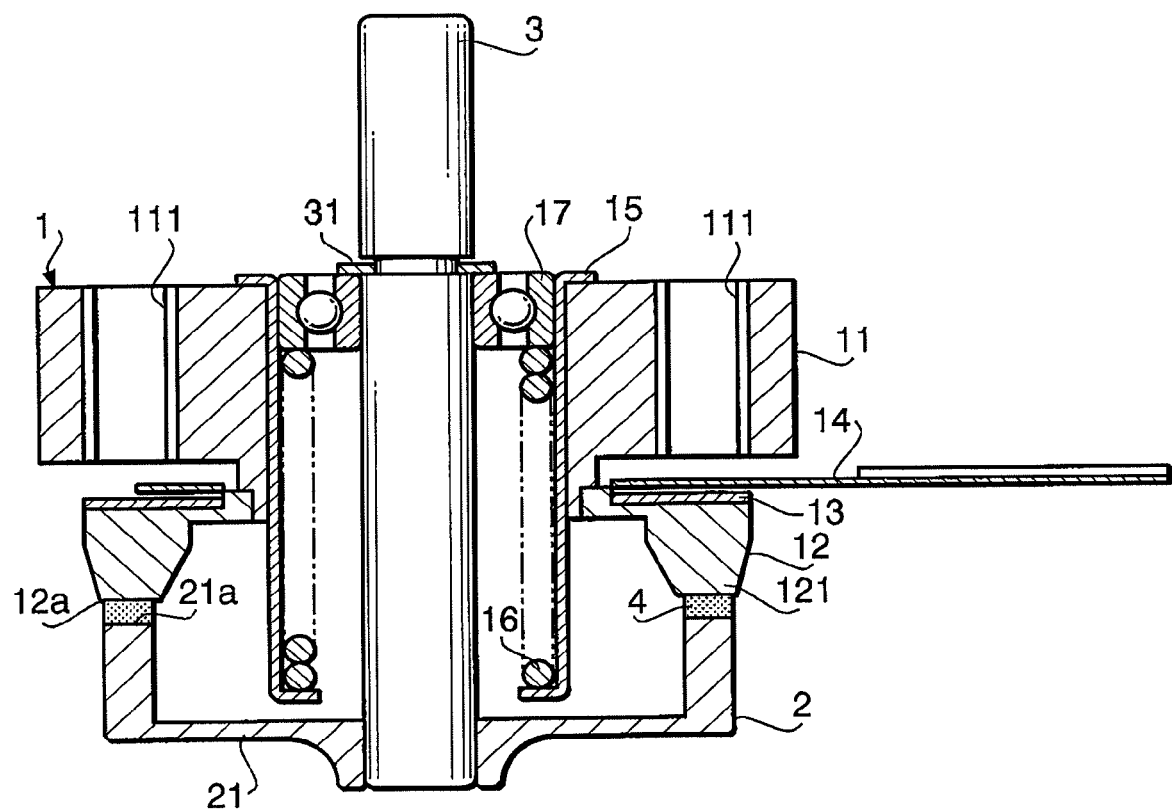
FIG. 2 is a cross-sectional view of the ultrasonic motor along a plane including a center axis of a rotating shaft thereof in the first embodiment according to the present invention.

Embodiments according to aspects of the present invention will be described with reference to the accompanying drawings. FIG. 1 is an external perspective view of an ultrasonic motor in a first embodiment. FIG. 2 is a cross-sectional view of the ultrasonic motor along a plane including a center axis of a rotating shaft 3 thereof. FIG. 3 partially shows an exploded perspective view of the ultrasonic motor. As shown in FIGS. 1 to 3, there is integrally provided under an annular pedestal 11 having mounting holes 111 for mounting the motor, a short-cylinder-shaped comb body 12 that includes a plurality of comb-like projections 121 circumferentially arranged. In addition, there is integrally mounted on the comb body 12 an annular thin-plate-shaped piezoelectric body 13 that includes a plurality of polarized segments circumferentially arranged so as to correspond to the comb-like projections 121, respectively. A stator 1 is configured with the pedestal 11, piezoelectric body 13 and comb body 12. Further, a radio frequency voltage can be applied to the piezoelectric body 13 via a flexible board 14. A shaft hole 112 is opened at a center of the pedestal 11, and a cylinder-shaped bush 15 is fixed on an inner circumferential surface of the shaft hole 112. In addition, a ball bearing 17 is provided at an upper end portion inside the bush 15, rotatably supporting the rotating shaft 3. A washer 31 prevents the rotating shaft 3 from pulling out of the ball bearing 17. A rotor 2 is attached to a lower end portion of the rotating shaft 3. The rotor 2 has a resin film 4 formed on an upper end surface of a peripheral wall 21 thereof, i.e., a pressure contact surface 21a. The resin film 4 is formed in a short cylinder shape to contact with a surface of the comb body 12, namely, a surface 12a of the comb-like projections 121. Furthermore, a compression coil spring 16 is provided between a lower end portion of the bush 15 and the ball bearing 17 in an axial direction. By an elastic force of the compression coil spring 16 in the axial direction, the ball bearing 17 and the rotating shaft 3 supported by the ball bearing 17 are biased in an upper direction, and the pressure contact surface 21a of the peripheral wall 21 of the rotor 2 (in this case, a pressure contact surface 4a of the resin film 4 formed on the pressure contact surface 21a) is biased toward the surface 12a of the comb body 12 of the stator 1.

The aforementioned resin film 4 is formed with fluorocarbon resin polytetraflouroethylene (PTFE) being applied on the pressure contact surface 21a of the rotor 2 to have a predetermined thickness. Lubricating property on the surface of the resin film 4 makes lower a static frictional coefficient between the pressure contact surface 12a of the comb body 12 and the pressure contact surface 4a of the resin film 4. Further, in order to configure a pressure contact force controlling portion according to aspects of the invention, the compression coil spring 16 provided inside the cylinder-shaped bush 15 is formed from a wire rod made of shape-memory alloy. The compression coil spring 16 is inserted into the cylinder-shaped bush 15 in a state compressed and shortened so as to have an inserted coil length L0 as shown in FIG. 4A. The compression coil spring 16 is formed to have a length L1 as shown in FIG. 4B as a natural length at a room temperature around 20° C. when removed from the cylinder-shaped bush 15, and to have a natural length L2 longer than L1, as shown in FIG. 4C, at a high temperature (approximately 50 to 100° C.) over a critical temperature. Relationship between the natural lengths L1 and L2 is established such that (L2−L0) is about twice as long as (L1−L0).

In the ultrasonic motor of the first embodiment, when a radio frequency voltage is applied to the piezoelectric body 13 via the flexible board 14, the piezoelectric body 13 vibrates, and the comb body 12 configured integrally with the piezoelectric body 13 also vibrates such that the plurality of comb-like projections 121 circumferentially arranged are displaced in a circumferential direction. The pressure contact surface 21a of the rotor 2 establishes pressure contact with the surface 12a of the comb body 12 via the resin film 4 by the bias force of the compression coil spring 16. Therefore, the above pressure contact generates a friction force between the pressure contact surface 4a of the resin film 4 of the rotor 2 and the surface 12a of the comb body 12. By the friction force, the rotor 2 provided with the resin film 4 are moved in the circumferential direction, and the rotor 2 and the rotating shaft 3 supporting the rotor 2 are rotated. A rotating force of the rotating shaft 3 is conveyed outside via a gear (not shown) fixed to the rotating shaft 3.

Furthermore, the pressure contact surface 21a of the rotor 2 does not directly contact with the surface 12a of the comb body 12 of the stator 1, and the resin film 4 exists therebetween. Hence, since metal surfaces of the rotor 2 and stator 1 do not directly contact with each other, a quiet rotational operation can be performed with a rotation noise being reduced. Further, there is the resin film 4 formed from PTFE between both the pressure contact surfaces of the comb body 12 and the rotor 2. Since the frictional coefficient on the pressure contact surface 4a of the resin film 4 is lower than that on metal, the frictional coefficient between both the pressure contact surfaces 12a and 4a is more reduced than a case where the pressure contact surface 12a of the comb body 12 directly contacts the pressure contact surface 21a of the rotor 2. Especially, the static frictional coefficient at the start-up of the ultrasonic motor is made lower, so that at the motor can smoothly be started up.

In the meantime, when temperature of the rotor 2, thereby, of the entire ultrasonic motor increases due to heat generated along with the rotation of the ultrasonic motor, temperature of the resin film 4 increases as well. As described above, the frictional coefficient on the resin film 4 has a dependency on the temperature. In the case of PTFE, as shown in FIG. 5, the frictional coefficient decreases as the temperature increases. Therefore, when the temperature of the ultrasonic motor increases, the frictional coefficient between the comb body 12 and the rotor 2 is made lower owing to the decrease of the frictional coefficient on the pressure contact surface 4a of the resin film 4, and thereby both the pressure contact surfaces 12a and 4a come into a slippery state. For this reason, efficiency of transmitting the displacement from the comb body 12 toward the rotor 2 in the circumferential direction is made lower, and consequently the rotational efficiency of the ultrasonic motor is worsened. However, in the first embodiment, temperature of the compression coil spring 16 is increased due to increased temperature of the ultrasonic motor. Then, when the temperature of the compression coil spring 16 becomes over the critical temperature of the shape-memory alloy, the natural length of the compression coil spring 16 extends from L1 to L2. In general, a spring constant of the compression coil spring 16 is constant regardless of change in the length thereof. Accordingly, when spring characteristics of the compression coil spring 16 are linear, a restoring force of the compression coil spring 16 becomes F times as large (here, $F=(L2-L0)/(L1-L0)$). In the present embodiment, $F=2$. Thereby, owing to the compression coil spring 16, the pressure contact force between the pressure contact surface 4a of the resin film 4 provided to the rotor 2 and the pressure contact surface 12a of the comb body 12 becomes twice as large. Meanwhile, as shown in FIG. 5, the frictional coefficient on the resin film 4 is made approximately half as high from 0.3 to 0.15 due to the temperature elevation. Hence, the frictional force (frictional force=pressure contact force×frictional coefficient) between the comb body 12 and resin film 4 can be kept substantially constant. In other words, even though the frictional coefficient on the resin film 4 is made lower along with the temperature elevation of the ultrasonic motor, since the pressure contact force between the comb body 12 and the rotor 2 increases, the frictional force between the comb body 12 and resin film 4, that is, between the comb body 12 and the rotor 2 can be kept substantially constant Consequently, the rotational efficiency of the ultrasonic motor is kept substantially constant and is not worsened.

Meanwhile, when the drive of the ultrasonic motor is stopped, and the temperature of the ultrasonic motor decreases down to the room temperature, the frictional coefficient on the resin film 4 increases. Instead, the temperature of the compression coil spring 16 is made lower than the critical temperature, and the natural length of the compression coil spring 16 is compressed from L2 to L1, depressing the restoring force of the compression coil spring 16. Therefore, in this case as well, the frictional force between the comb body 12 and resin film 4 is kept substantially constant, and the rotational efficiency of the ultrasonic motor is not worsened.

In the first embodiment, the pressure contact force controlling portion according to aspects of the invention is configured with the compression coil spring 16, which is formed from the shape-memory alloy. In this configuration, the pressure contact force between the comb body 12 and the resin film 4 is changed by using the property that the natural length of the compression coil spring 16 varies depending on the temperature. However, the pressure contact force controlling portion may be configured such that the pressure contact force is controlled by changing the inserted coil length of the compression coil spring 16 inside the bush 15 depending on the temperature. FIG. 6 exemplifies a structure of an ultrasonic motor in a second embodiment. The same portions as those in the first embodiment are provided with the same reference characters, and explanations thereof will be omitted. In the second embodiment, a bush 15 is formed from shape-memory alloy. By deforming a lower portion 15a, which is located at a lower side of the bush 15 in FIG. 6, depending on the temperature, the inserted coil length of the compression coil spring 16 inserted between the lower portion 15a of the bush 15 and the ball bearing 17 fixed to an upper portion of the bush 15 is changed. At the room temperature lower than the critical temperature, the bush 15 has a longer length with the lower portion 15a thereof being extended as shown by a chain double-dashed line in FIG. 6. Namely, the bush 15 is configured to be in a shape with a longer inserted coil length L11 at the room temperature. In addition, at higher than the critical temperature, as shown by a solid line in FIG. 6, the bush 15 has a shorter length with the lower portion 15a being bent to protrude outward. Namely, the bush 15 is configured to have a shape with a shorter inserted coil length L12 at higher than the critical temperature. Here, the inserted coil lengths L11 and L12 are designed such that the restoring force of the compression coil spring 16 (i.e., the pressure contact force between the comb body 12 and the resin film 4) at the length L12 is twice as large as that at the length L11. It is noted that the compression coil spring 16 is formed from a normal spring wire.

In the second embodiment, when the ultrasonic motor starts to be driven, the lower portion 15a of the bush 15 is extended with the compression coil spring 16 having the longer inserted coil length L11 as shown by the chain double-dashed line in FIG. 6. Therefore, the restoring force of the compression coil spring 16 is small, and the pressure contact force between the comb body 12 and resin film 4 due to the compression coil spring 16 is low. At this time, since the frictional coefficient on the resin film 4 is large, a predetermined frictional force is generated even though the pressure contact force is low, and predetermined rotational efficiency is achieved. Meanwhile, when the ultrasonic motor is driven, and the temperature rises, the frictional coefficient on the resin film 4 is made lower. However, at a moment when the temperature of the bush 15 reaches the critical temperature along with the temperature rise of the bush 15, the lower portion 15a of the bush 15 is deformed so as to be compressed upward as indicated by the solid line in FIG. 6. Thereby, the compression coil spring 16 inserted into the bush 15 is compressed as well to have the inserted coil length L12, and the restoring force of the compression coil spring 16 is made higher, increasing the pressure contact force between the comb body 12 and resin film 4. Thus, even though the frictional coefficient on the resin film 4 is decreased due to the temperature rise, the frictional force is made larger owing to the increase of the pressure contact force, and the predetermined rotational efficiency is maintained.

In the same manner as the second embodiment, in a third embodiment, the pressure contact force is changed with the inserted coil length of the compression coil spring 16 in the bush 15 being changed depending on the temperature. FIG. 7 exemplifies a structure of an ultrasonic motor in a third embodiment. The same reference characters are given to the same portions as those in the first and second embodiments. In the third embodiment, a washer 31, which locks the ball bearing 17 located at an upper portion inside the bush 15 with respect to the rotation shaft 3, is formed from shape-memory alloy as the pressure contact force controlling portion according to aspects of the invention. The washer 31 is formed to have a larger outer diameter than that in each of the first and second embodiments, and configured such that an outer portion 31a thereof is deformed in an axial direction of the rotation shaft 3 depending on the temperature. Namely, the washer 31 has the outer portion 31a extending straight in a direction perpendicular to the axial direction at lower than the critical temperature as indicated by a chain double-dashed line in FIG. 7. At this time, the ball bearing 17 is pushed upward along the axial direction by the restoring force of the compression coil spring 16. Consequently, the compression coil spring 16 is made longer to have the inserted coil length L11. At higher than the critical temperature, the outer portion 31a is bent and arranged along the axial direction as indicated by a solid line in FIG. 7. At this time, the ball bearing 17 is pushed downward along the axial direction against the restoring force of the compression coil spring 16, making the compression coil spring 16 shorter to have the inserted coil length L12. Thereby, the location of the ball bearing 17 in the axial direction is varied by the deformation of the outer portion of the washer 31. Hence, the length of the compression coil spring 16 inserted in the bush 17 is changed, so that the restoring force of the compression coil spring is changed. In this case, the inserted coil lengths L11 and L12 are designed such that the restoring force of the compression coil spring 16 (i.e., the pressure contact force between the comb body 12 and the resin film 4) at the length L12 is twice as large as that at the length L11. It is noted that the compression coil spring 16 is formed from a normal spring wire.

In the third embodiment, when the ultrasonic motor begins to be driven, as indicated by the chain double-dashed line in FIG. 7, the washer 31 has the outer portion 31a extending horizontally, and the ball bearing 17 is pushed upward such that the compression coil spring 16 is made longer with the inserted coil length L11. Therefore, the pressure contact force between the comb body 12 and resin film 4 that is caused by compression coil spring 16 is lower. At this time, since the frictional coefficient on the resin film 4 is higher, the predetermined frictional force, that is, the predetermined rotational efficiency is achieved even though the pressure contact force is lower, Meanwhile, when the ultrasonic motor is driven, and the temperature rises, the frictional coefficient on the resin film 4 is made lower. However, as indicated by the solid line in FIG. 7, at a moment when the washer 31 reaches the critical temperature, the outer portion 31a is bent downward, pushing the ball bearing 17 downward such that the compression coil spring 16 is compressed to have the inserted coil length L12. Hence, the restoring force of the compression coil spring 16 is increased, and the pressure contact force between the comb body 12 and the resin film 4 is increased. Thus, even though the frictional coefficient on the resin film 4 is made lower along with the temperature elevation, the predetermined frictional force on the resin film 4 is achieved owing to the increase of the pressure contact force, and the predetermined rotational efficiency is maintained.

In the first to third embodiments, the compression coil spring 16, bush 15, and washer 31 are formed from the shape-memory alloy, respectively. However, in the second and third embodiments, the bush 15 and washer 31 may be formed from bimetal continuously deformed depending on the temperature, respectively. By employing such configurations, the lower portion 15a of the bush 15 or the outer portion 31a of the washer 31, which is formed from the bimetal, is continuously deformed. Therefore, the inserted coil length of the compression coil spring 16 can continuously be varied. Thereby, as shown in FIG. 5, it is possible to vary the pressure contact force on the resin film 4 by the compression coil spring 16 with following the continuous change of the frictional coefficient on the resin film 4 depending on the temperature, in order to attain an ultrasonic motor that can keep the rotational efficiency constant over a range within which the temperature may change.

In addition, the present invention is not limited to the ultrasonic motor configured with the single structure in each of the first to third embodiments. The ultrasonic motor according to aspects of the invention may be configured with any appropriate combination from the structures in the first to third embodiments and the above structure using the bimetal so as to attain more excellent rotational efficiency that is less affected by the temperature change. Further, an elastic element for generating the pressure contact force is not limited to the compression coil spring. The elastic element according to aspects of the invention may include a plate spring configured such that a restoring force thereof varies depending on the temperature.

Furthermore, the resin film 4 is not limited to PTFE, and may include resin material such as PFA (perfluoroalkoxy polymer resin) and FEP (fluorinated ethylene-propylene).

Additionally, the ultrasonic motor according to aspects of the invention may be configured with a resin film having such a property that the frictional coefficient thereon increases as the temperature rises contrary to the first to third embodiments. In this case, the compression coil spring is required to generate a weaker pressure contact force as the temperature rises.

The present disclosure relates to the subject matter contained in Japanese Patent Application No. P2006-342092, filed on Dec. 20, 2006, which is expressly incorporated herein by reference in its entirety.

What is claimed is:

1. An ultrasonic motor, comprising:
   a stator that includes a comb body with a plurality of circumferentially-arranged comb-like projections and a piezoelectric body integrally mounted on the comb body;
   a rotor rotatable with respect to the stator, the rotor establishing pressure contact with the stator;
   a resin film formed on at least one of pressure contact surfaces of the stator and rotor; and
   a pressure contact force controlling portion that includes:
   an elastic member configured to generate a pressure contact force between the stator and rotor with an elastic force thereof; and
   a compressing portion configured to compress and shorten the elastic member,
   wherein the pressure contact force controlling portion controls the pressure contact force between the stator and rotor by varying the elastic force of the elastic member depending on temperature of the motor.

2. The ultrasonic motor according to claim 1,
   wherein the elastic member includes a compression coil spring provided between the stator and rotor, the compression coil spring being formed from shape-memory material that varies a natural length thereof depending on the temperature, and wherein the compressing portion compresses and shortens the compression coil spring down to a predetermined length.

3. The ultrasonic motor according to claim 1,
wherein the elastic member includes a compression coil spring provided between the stator and rotor, and
wherein the compressing portion varies a compressed length of the compression coil spring depending on the temperature.

4. The ultrasonic motor according to claim 3,
wherein the compressing portion includes a bush provided to the stator so as to rotatably support the rotor,
wherein the compression coil spring is inserted into the bush, and
wherein the bush is formed from shape-memory material such that a length thereof in an axial direction thereof varies depending on the temperature.

5. The ultrasonic motor according to claim 3,
wherein the compressing portion includes:
    a bush provided to the stator;
    a ball bearing configured to rotatably support the rotor, the ball bearing being biased by the compression coil spring inside the bush; and
    a locking member configured to lock the ball bearing biased by the compression coil spring so as to rotatably support the rotor, and
wherein the locking member is formed from shape-memory material to change a locking position where the ball bearing is locked depending on the temperature.

6. The ultrasonic motor according to claim 1,
wherein the resin film includes fluorocarbon resin.

7. The ultrasonic motor according to claim 6,
wherein the fluorocarbon resin included in the resin film includes at least one of polytetraflouroethylene (PTFE), perfluoroalkoxy polymer resin (PFA), and fluorinated ethylene-propylene (FEP).

8. An ultrasonic motor, comprising:
a stator that includes a comb body with a plurality of circumferentially-arranged comb-like projections and a piezoelectric body integrally mounted on the comb body;
a rotor rotatable with respect to the stator, the rotor establishing pressure contact with the stator;
a resin film formed on at least one of pressure contact surfaces of the stator and rotor, a frictional coefficient on the resin film varying depending on temperature of the motor; and
a pressure contact force controlling portion that includes:
    an elastic member configured to generate a pressure contact force between the stator and rotor with an elastic force thereof; and
    a compressing portion configured to compress and shorten the elastic member,
wherein the pressure contact force controlling portion controls the pressure contact force between the stator and rotor by varying the elastic force of the elastic member depending on the temperature such that a frictional force on the resin film is maintained substantially constant.

* * * * *